United States Patent
Hwang et al.

(10) Patent No.: US 7,443,813 B2
(45) Date of Patent: Oct. 28, 2008

(54) METHOD FOR REDUCING A FALSE ALARM PROBABILITY FOR A NOTIFICATION FOR TRANSMISSION OF CONTROL INFORMATION FOR AN MBMS IN A MOBILE COMMUNICATIONS SYSTEM

(75) Inventors: Sung-Oh Hwang, Yongin-si (KR); Kook-Heui Lee, Yongin-si (KR); Sung-Ho Choi, Suwon-si (KR); Kyeong-In Jeong, Suwon-si (KR); Ju-Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 195 days.

(21) Appl. No.: 11/106,268

(22) Filed: Apr. 14, 2005

(65) Prior Publication Data

US 2005/0271007 A1 Dec. 8, 2005

(30) Foreign Application Priority Data

Apr. 14, 2004 (KR) .................... 10-2004-0025963

(51) Int. Cl.
*H04Q 7/38* (2006.01)

(52) U.S. Cl. .................... 370/312; 370/349; 455/414.1

(58) Field of Classification Search ................ 370/312, 370/349, 270, 271; 455/414.1, 503
See application file for complete search history.

(56) References Cited

U.S. PATENT DOCUMENTS

| 2003/0157949 | A1* | 8/2003 | Sarkkinen et al. | 455/503 |
| 2004/0017809 | A1* | 1/2004 | Park | 370/390 |
| 2005/0076369 | A1* | 4/2005 | Cai et al. | 725/62 |
| 2006/0019641 | A1* | 1/2006 | Vayanos et al. | 455/414.1 |
| 2006/0156370 | A1* | 7/2006 | Parantainen | 725/132 |

* cited by examiner

*Primary Examiner*—Edward Urban
*Assistant Examiner*—Adeel Haroon
(74) *Attorney, Agent, or Firm*—The Farrell Law Firm, PC (57) ABSTRACT

A notification method for informing a UE of an existence or absence of control information for an MBMS in a mobile communication system supporting the MBMS. In the method, the UE receives a notification indicator channel independently reporting the existence of the control information for the MBMS, confirms at least one notification indicator of the notification indicator channel, thereby confirming the existence of the control information relating to the requested MBMS. Further, a method is proposed, which can minimize an alarm due to other MBMSs.

1 Claim, 6 Drawing Sheets

(PRIOR ART)

METHOD FOR REDUCING A FALSE ALARM PROBABILITY FOR A NOTIFICATION FOR TRANSMISSION OF CONTROL INFORMATION FOR AN MBMS IN A MOBILE COMMUNICATIONS SYSTEM

PRIORITY

This application claims priority to an application entitled "Method for Reduction of False Alarm Probability on Notification for Transmission of Control Information for MBMS in Mobile Communication System" filed in the Korean Intellectual Property Office on Apr. 14, 2004 and assigned Serial No. 2004-25963, the contents of which are incorporated herein by reference.

BACKGROUND OF THE INVENTION

1. Field of the Invention

The present invention relates generally to a Multimedia Broadcast/Multicast Service (MBMS) in a mobile communication system, and more particularly to a method for minimizing false alarms based on a notification of an existence or absence of control information for the MBMS to a User Equipment (UE).

2. Description of the Related Art

Currently, with the development of communication technology, a conventional mobile communication system providing a voice service is being developed into a packet service communication system capable of transmitting mass storage data, such as packet data and circuit data, and a multimedia broadcast/communication system capable of transmitting a multimedia service. Accordingly, in order to support the multimedia broadcast/communication system, an MBMS for providing a service to a plurality of UEs from at least one multimedia data source has been discussed.

Generally, an MBMS transmits the same multimedia data to a plurality of receivers through a radio network. Herein, the plurality of receivers share one radio channel, such that radio transmission resources can be saved. Because an MBMS transmits multimedia data such as image data, voice data, still image data and text data in real-time, and simultaneously provides voice data and image data according to the types of the multimedia data, the MBMS requires a large quantity of transmission resources.

In an MBMS, because the same data must be transmitted to a plurality of cells including users, a Point-to-Point (PtP) or a Point-to-Multi-Point (PtM) connection is used according to the number of users located in each cell. That is, the PtP provides an MBMS requested by each UE through a dedicated channel allocated to each UE, while the PtM provides a corresponding service to UEs requesting the same MBMS through a common channel allocated to each MBMS.

In the description of the present invention, a 3G asynchronous mobile communication network proposed by the $3^{rd}$ Generation Project Partnership (GPP) is described as one example of a mobile communication network. However, the present invention can be applied to another mobile communication network using an MBMS.

Figure 1:
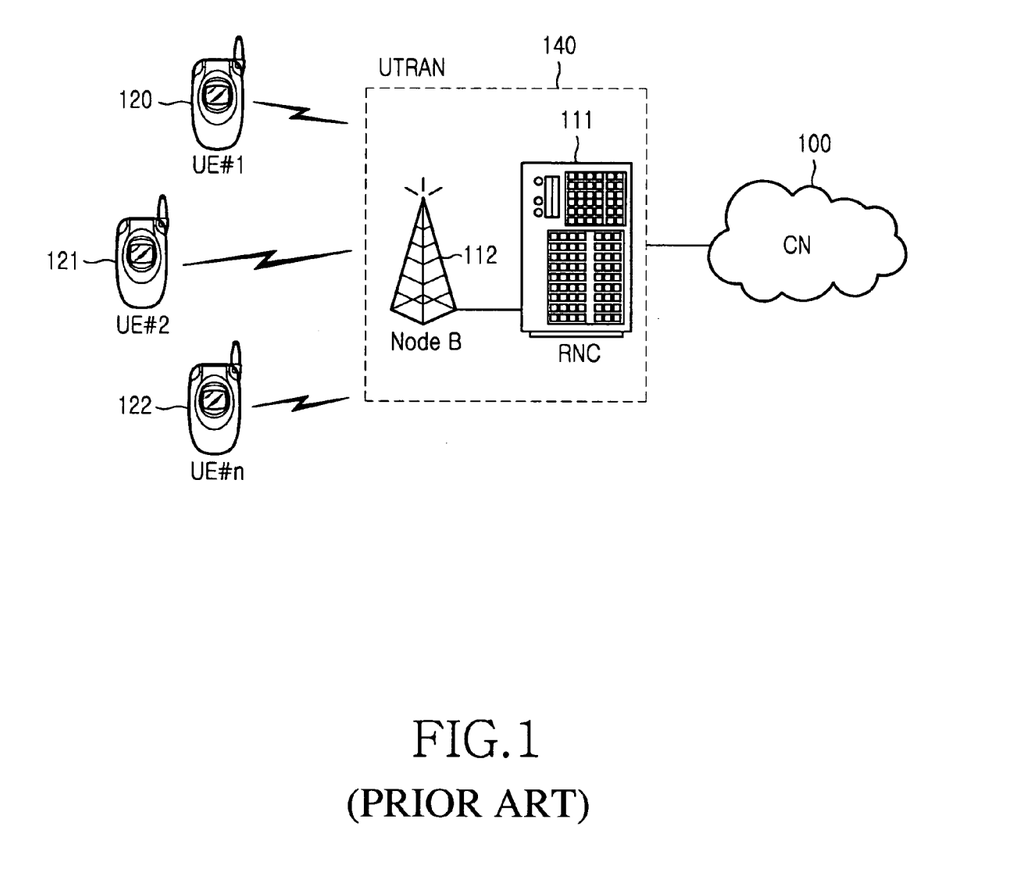
FIG. 1 is a diagram illustrating a network structure of a conventional 3G asynchronous mobile communication system supporting an MBMS.

FIG. 1 is a diagram illustrating one example in which a conventional 3G asynchronous mobile communication network proposed by the $3^{rd}$ Generation Partnership Project (GPP), provides an MBMS. More specifically, FIG. 1 illustrates nodes joining the MBMS provided by the 3GPP mobile communication network.

Referring to FIG. 1, a Core Network (CN) 100 supplies an MBMS, transmits the MBMS to a UMTS Radio Access Network (UTRAN) 110, and authenticates UEs 120 to 122. The UTRAN 110 connects the CN 100 to the UEs 120 to 122, and allocates and manages wired/wireless resources for transmission of the MBMS. Further, the UTRAN 110 includes a Radio Network Controller (RNC) 111 and a node B 112. The RNC 111 may control a plurality of node Bs in addition to the node B 112. Herein, each of the node Bs including the node B 112 includes a plurality of cells. Accordingly, the cells can be distinguished from another according to frequencies or locations of each cell.

Each of the UEs 120 to 122 can receive the MBMS. Additionally, a plurality of UEs may exist in each cell.

In the MBMS, a basic service unit is a cell and the service is provided through a PtP scheme or a PtM scheme in consideration of radio environments of the cell and the number of UEs to receive the MBMS.

In order to provide the MBMS, it is necessary to report a start of the MBMS or a start of a session (basic unit of MBMS transmission in a CN) of a random MBMS, and count the number of UEs for determining one of the PtP scheme and the PtM scheme used for providing the MBMS.

When the MBMS is provided through the PtM scheme according to the counting process, it is necessary to report channel information for receiving the MBMS through the PtM scheme and transmit a plurality of control information, such as notification for change of the transmission scheme (PtP and PtM), while the MBMS is being provided. Further, it is necessary to provide a method for informing UEs if the control information is transmitted.

Figure 2:
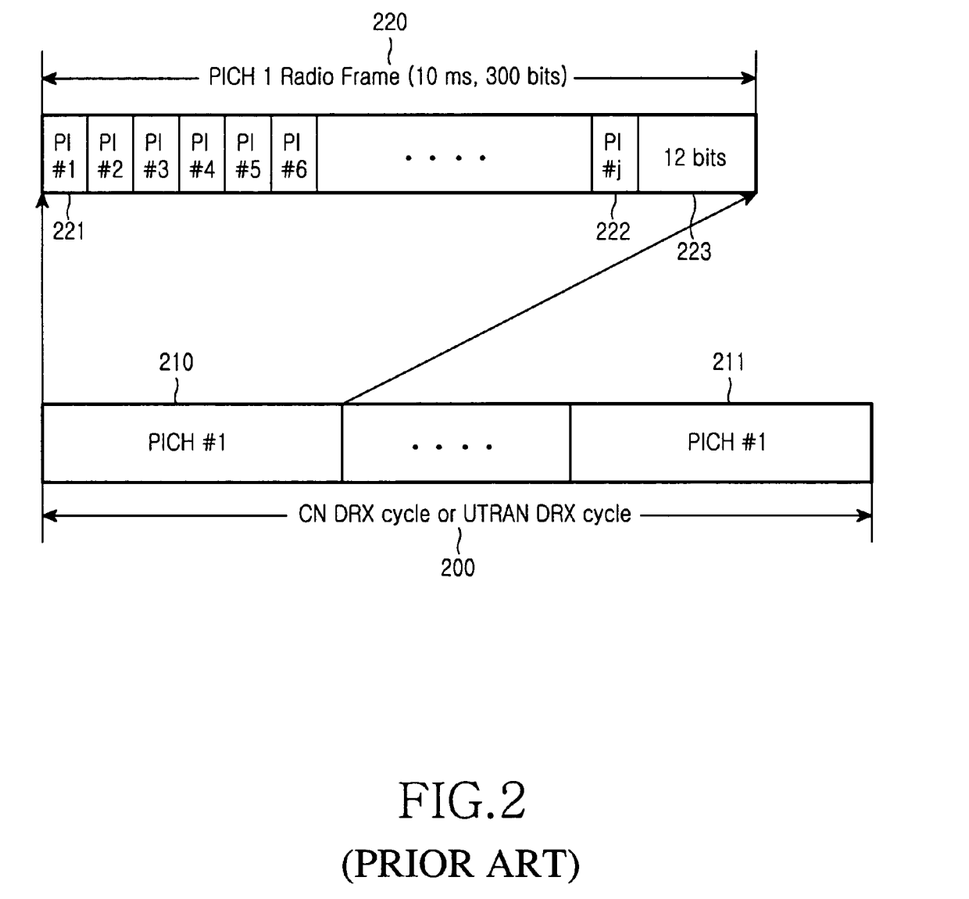
FIG. 2 is a diagram illustrating a PICH for transmission of data or control information in a conventional 3G mobile communication system.

FIG. 2 is a diagram illustrating a Paging Channel (PCH) and a paging method for informing a UE that a voice service, a packet service, or control information is transmitted in a conventional 3GPP communication network. Referring to FIG. 2, a Paging Indicator Channel (PICH) 220 has a length of 10 ms. The PICH 220 is a channel transmitted after being band-spread with spreading factor 256 and may transmit 300 bits for each 10 ms. Herein, 12 bits 223 of the 300 bits are allocated as a currently unused portion, and represent bits reserved for expansion of a mobile communication system in the future.

Accordingly, the PICH 220 may transmit 288 bits for each 10 ms. That is, the PICH 220 may transmit Paging Indicators 221 (PIs) ranging from a minimum of 18 to a maximum of 144 bits for each 10 ms. Herein, each PI includes two bits at minimum and 16 bits at maximum. The number of the PIs that can be transmitted for each 10 ms can be determined using the number of UEs requesting paging.

When the PI 221 has a positive value (+1), the UE receives a PCH transmitting paging information for the UE and finally confirms paging for the UE. However, when the PI 221 has a negative value (−1), the UE waits to receive the next PICH, and then confirms the value of the PI. The PCH transmits detailed paging information, which includes an identifier of a UE and cause values for reporting the paging cause for the UE, to a UE having confirmed the PI. Accordingly, the UE may finally confirm if the UE has been paged only after receiving the detailed paging information. That is, the UE may confirm that the UE has been paged only after checking the PI having a positive value and receiving the PCH. Herein, the step of receiving the PI having the positive value will be referred to as "primary paging" and the step of confirming final paging after receiving the PCH will be referred to as "secondary paging".

Generally, a 3GPP mobile communication network provides a method of confirming if paging information exists in a specific location according to each UE, in order to reduce battery consumption of the UEs. This method prevents the UE from continuously receiving a PICH for continuously confirming if the UE has been paged even when the UE does not actually use a voice service or a data service. That is, the method prevents the battery consumption of the UE from increasing because of continuous reception of the PICH.

Accordingly, a UE receives the PICH only in a CN Discontinuous Reception (DRX) cycle or a UTRAN DRX cycle 200 and confirms if paging information exists. That is, the CN DRX cycle or the UTRAN DRX cycle 200 is a parameter used for saving the power of the UE. The CN DRX cycle is a value determined by a CN and the UTRAN DRX cycle is a value determined by a UTRAN for use. The CN DRX cycle or the UTRAN DRX cycle 200 is transmitted to UEs in a cell through a Broadcast Channel (BCH) transmitting system information.

When a UE is in a Radio Resource Control (RRC) connection state with a UTRAN, the UE confirms that primary paging information for the UE exists by using the UTRAN DRX cycle. Further, when the UE is in an idle mode, the UE confirms that the primary paging information for the UE exists by using the CN DRX cycle.

The CN DRX cycle or the UTRAN DRX cycle 200, as described above, reduces battery consumption of the UE, and also prevents UEs from confusing primary paging for other UEs as primary paging for the UEs themselves because of the dispersion of paging signals for the UEs in a mobile communication network, thereby reducing unnecessary operation of receivers of the UEs.

For example, when 18 PIs are transmitted through one PICH and the CN DRX cycle is 1.28 seconds, the number of PIs actually used for paging a UE is 2304 (18×128). When it is assumed that the number of UEs waiting for paging in a mobile communication network is 10,000 and primary paging for a UE is distinguished by only a PI of a PICH, one PI may report existence of primary paging for about 556 UEs. Even when primary paging for only one UE exists, the remaining 555 UEs also receive the PCH and finally confirm secondary paging. When the DRX cycle is used, about 5 UEs correspond to one PI. Further, when it is reported that primary paging for one UE exists, the number of UEs unnecessarily receiving a PCH for secondary paging is reduced to four.

Figure 3:
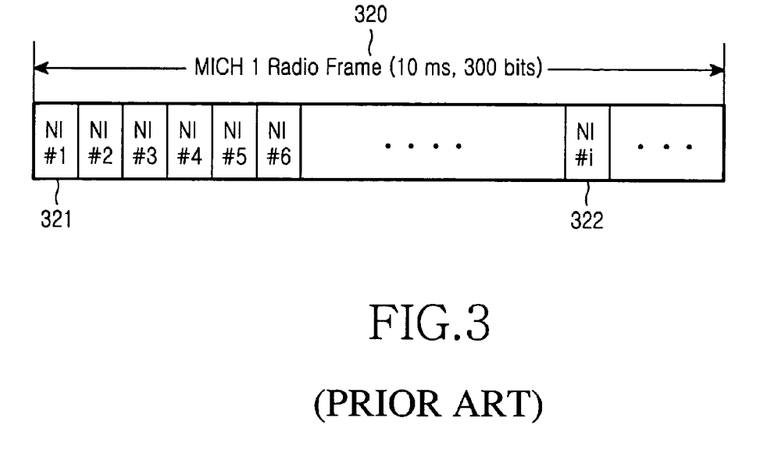
FIG. 3 is a diagram illustrating an MICH for transmission of control information in a conventional mobile communication system supporting an MBMS.

FIG. 3 is a diagram illustrating a conventional example for reporting an existence of control information for an MBMS in a mobile communication system providing the MBMS.

A method for reporting existence of control information according to offer of an MBMS in a 3GPP is similar to an existing paging scheme for reporting existence of general control information according to a voice service or a packet service. That is, a final paging is confirmed through reception of a paging message after a PI is received.

Referring to FIG. 3, in relation to the above-description, the 3GPP defines an MBMS Specific Paging Indicator Channel (MICH) 320 in order to report paging of the control information for the MBMS. Notification Indicators (NIs) 321 and 322 are transmitted through the MICH for reporting the existence of paging for the MBMS. The notification represents notifying UEs having joined a predetermined MBMS of a start of the MBMS or a session start of the MBMS, and existence of control information relating to the MBMS. Further, a notification message is transmitted through an MBMS Common Control Channel (MCCH) defined for transmitting MBMS control information.

Herein, the reception of an NI having a positive value by a UE supporting an MBMS will be referred to as a "primary notification", and the reception of a notification message transmitted through an MCCH or other control information will be referred to as a "secondary notification".

Additionally, the 3GPP has not defined a separate DRX cycle for an MBMS in order to reduce battery consumption of a UE receiving the MBMS. This prevents a receiver of the UE from unnecessarily operating twice according to two paging cycles, i.e., one DRX cycle for a primary paging with respect to a service (a general packet service or circuit service), except for the MBMS, and the other DRX cycle for a primary notification for the MBMS.

As described above, the DRX cycle for the MBMS has not been defined, such that the battery of the UE can be prevented from being consumed. However, as described in FIG. 2, it is problematic in that a method of increasing the number of PIs by using the DRX cycle is not used. Further, there is a problem in that the number of UEs unnecessarily receiving an MCCH for a secondary notification increases according to an increase in the number of MBMSs corresponding to an NI for a primary notification.

For example, when it is assumed that 1000 MBMSs exist in a 3GPP mobile communication system and 18 NIs exist in an MICH, 56 services corresponds to one NI for a primary notification. Herein, when it is considered that each MBMS is provided to a plurality of UEs and a primary notification is performed for a plurality of MBMSs, simply by using NIs of an MICH, without an MBMS specific DRX cycle, there is a problem in that UEs must unnecessarily confirm MCCHs for a secondary notification for the MBMS.

SUMMARY OF THE INVENTION

Accordingly, the present invention has been designed to solve the above and other problems occurring in the prior art. It is an object of the present invention to provide a method for more efficiently transmitting a notification message that reports an existence or absence of control information for a broadcasting service when a mobile communication system provides the broadcasting service.

It is another object of the present invention to provide a method for a primary notification for reporting an existence of MBMS control information or a notification message, which prevents a UE from unnecessarily receiving a notification channel for a service for which the UE has not joined.

It is further another object of the present invention to provide a method for checking position information for a broadcasting service requested by a UE through information received through a broadcasting channel, and confirming at least one notification indicator at the checked position, thereby receiving a notification channel, when a mobile communication system provides the broadcasting service.

It is still another object of the present invention to provide a method for calculating, by a UE, a correspondence relation between a notification indicator and an MBMS, thereby recognizing an existence of a notification for the MBMS for which the UE has joined, when a mobile communication system provides the MBMS It is yet another object of the present invention to provide a method for informing, by a UTRAN, a UE of a correspondence relation between a determined notification indicator and an MBMS, thereby enabling the UE having joined the MBMS to recognize existence of a notification channel.

It is yet another object of the present invention to provide a method for determining, by a base station, a notification indicator representing the existence of an MBMS notification group and a notification channel for a corresponding MBMS, thereby increasing the transmission reliability.

In accordance with an aspect of the present invention, there is provided a method for efficiently receiving a notification channel in a mobile communication system including at least one user equipment, a radio access network, and a core network, control information for a broadcasting service requested by a predetermined user equipment being notified through the notification channel, the radio access network providing the broadcasting service to the user equipments according to services, the core network being connected to the radio access network for providing the broadcasting service. The method includes the steps of: transmitting a notification indicator channel including at least two notification indicators to the user equipment, the notification indicators representing existence of the notification channel; and confirming the notification channel when said at least two notification indicators have positive values a result after the user equipment confirms the notification indicator channel in a predetermined period.

In accordance with another aspect of the present invention, there is provided a method for receiving a notification channel in a mobile communication system providing a broadcasting service, the mobile communication system including at least one user equipment, a radio access network, and a core network, control information for the broadcasting service requested by a predetermined user equipment being notified through the notification channel, the radio access network providing the broadcasting service to the user equipments according to services, the core network being connected to the radio access network for providing the broadcasting service. The method includes the steps of: receiving information for a notification indicator channel through a broadcasting channel, the notification indicator channel representing existence or absence of the notification channel; determining a position of at least one notification indicator with reference to the information for the notification indicator channel, said at least one notification indicator representing existence of the control information for the broadcasting service; and confirming the notification channel when said at least one notification indicator for the broadcasting service has been set as a positive value in the determined position.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail hereinafter with reference to the accompanying drawings. In the following description of the present invention, a detailed description of known functions and configuration incorporated herein will be omitted when it may obscure the subject matter of the present invention.

The present invention provides a method for transmitting a start of an MBMS, a session start of the MBMS, and MBMS-related control information to UEs having joined the MBMS in a 3G asynchronous mobile communication system supporting the MBMS. That is, the present invention proposes a method for reducing a false alarm, which causes a UE having joined a random MBMS to start a second notification checking, because of a primary notification for another MBMS when a primary notification procedure is performed in order to report the existence of the control information.

Further, the present invention proposes a method in which a UE can recognize a primary notification for an MBMS that the UE has joined in a preset UE specific DRX cycle, and proposes a method of ensuring reliability when a CN or UTRAN (upper system) transmits NIs for the primary notification for the MBMS.

In the present invention, an NI representing existence or absence of an alarm message (i.e., a notification message) corresponding to an MBMS requested by a UE is confirmed using an MICH that reports the existence or absence of an alarm of control information for an MBMS. Herein, the UE receives at least one NI and confirms if a primary notification for a corresponding MBMS exists, instead of receiving one NI in the MICH and confirming a primary notification for an MBMS for which the UE has joined.

Figure 4:
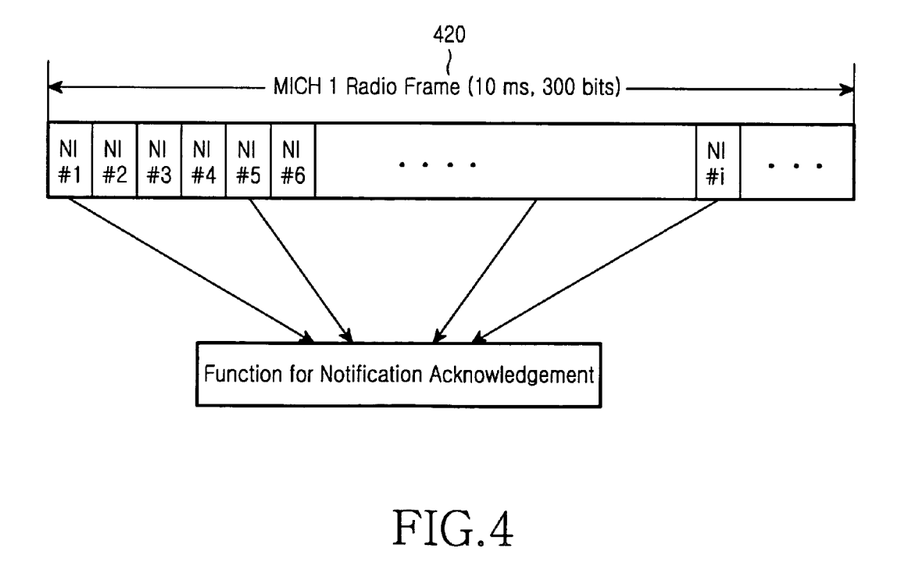
FIG. 4 is a diagram illustrating an MICH proposed by the present invention.

FIG. 4 is a diagram illustrating a method for confirming existence of a primary notification for transmission of a start of an MBMS that a UE has joined, a session start of the corresponding MBMS, or control information, using a method for the primary notification, which is proposed by the present invention. Referring to FIG. 4, an MICH 420 transmits an NI for the MBMS. Accordingly, a plurality of NIs may be transmitted. For example, it is assumed that one MICH transmits 18 NIs and there are 300 MBMSs available that UEs have joined. Herein, it is assumed that the MBMSs are distinguished from each other using service identifiers.

Accordingly, an MBMS notification group for the MBMS exists in accordance with the 18 NIs and about 17 MBMSs are included in each one notification group.

That is, in an example for a method of constructing the MBMS notification group, a modulo calculation is performed for identifiers of the MBMSs by 18, i.e., he number of NI, such that the identifiers correspond to 18 MBMS notification groups according to the remainder values obtained through the modulo calculation.

Herein, when a random UE joins an MBMS and receives an NI corresponding to an MBMS notification group to which the MBMS belongs, the UE receives an NI sixteen times because of another service, i.e., for a service different from the MBMS for which the UE has joined. Accordingly, the UE unnecessarily receives an MCCH, which includes a notification message, i.e., final information, about sixteen times for the corresponding MBMS.

Table 1 shows an MBMS notification group that is distinguishable through an MICH of 10 ms when a UE recognizes an existence of a notification message or control information through a plurality of NIs proposed by the present invention.

That is, Table 1 shows the MBMS notification group according to selected values of the NI.

TABLE 1

| Total Number of NIs | Number of NI to be selected | Combination value |
|---|---|---|
| 6 | 1 | 6 |
| 6 | 2 | 15 |
| 6 | 3 | 20 |
| 6 | 4 | 15 |
| 6 | 5 | 6 |
| 6 | 6 | 1 |
| 9 | 1 | 9 |
| 9 | 2 | 36 |
| 9 | 3 | 84 |
| 9 | 4 | 126 |
| 9 | 5 | 126 |
| 9 | 6 | 84 |
| 9 | 7 | 36 |
| 9 | 8 | 9 |
| 9 | 9 | 1 |
| 18 | 1 | 18 |
| 18 | 2 | 153 |
| 18 | 3 | 816 |
| 18 | 4 | 3060 |
| 18 | 5 | 8568 |
| 18 | 6 | 18564 |
| 18 | 7 | 31824 |
| 18 | 8 | 43758 |
| 18 | 9 | 48620 |
| 18 | 10 | 43758 |
| 18 | 11 | 31824 |
| 18 | 12 | 18564 |
| 18 | 13 | 8568 |
| 18 | 14 | 3060 |
| 18 | 15 | 816 |
| 18 | 16 | 153 |
| 18 | 17 | 18 |
| 18 | 18 | 1 |

In Table 1, the total number of NIs of the first column represents the number of NIs allocated to one MICH. That is, the total number of NIs is the total number of NIs for each MICH. The number of NI to be selected in the second column represents the number of NIs used for recognizing existence of notification or control information. The combination value of the third column represents the available number of MBMS notification groups according to a change in the number of the NIs used for recognizing the existence of notification or control information for a random MBMS with respect to the total number of the NIs.

Referring to Table 1, when 18 NIs exist and the notification groups are distinguished using only one NI, 18 MBMS notification groups may exist. Further, when the notification groups are distinguished using two NIs, 153 MBMS notification groups may exist.

Accordingly, when it is assumed that 300 MBMSs exist and one of the total 18 NIs is used, the UE must unnecessarily receive the MCCH, sixteen times, because of primary notifications for other services in order to confirm a second notification. Further, when two of the total 18 NIs are used, the number of times by which the UE must unnecessarily receive the MCCH in order to confirm the second notification is approximately once. In addition, when three of the total 18 NIs are used, the number of times by which the UE must unnecessarily receive the MCCH is zero.

Herein, a calculation result of the third column can be defined by Equation (1).

$$\text{Number of Notification Group} = {}_aC_b, \text{ wherein } a=N_{NI}, b=N_{Nis} \quad (1)$$

In Equation (1), C is a combination operator used in the mathematics, $N_{NI}$ is the total number of NIs existing in one MICH, and $N_{NIs}$ is the number of NIs used for recognizing existence of the notification or the control information.

As shown in Table 1, when the total number of NIs used for a primary notification increases to a predetermined number, the number of MBMS notification groups in one MICH also increases. For example, the cases of ${}_9C_2$ and ${}_{18}C_1$ are considered as follows.

For ${}_9C_2$, 36 bits correspond to each NI. For ${}_{18}C_1$, 18 bits correspond to each NI. Herein, when it is assumed that the transmit powers of all of the transmitted bits are identical, the transmit power of an NI transmitted for ${}_9C_2$, is twice as large as that of an NI transmitted for ${}_{18}C_1$.

Accordingly, a UE for each NI has the most improved reception ability for ${}_9C_2$. Further, the number of MBMS notification groups for ${}_9C_2$ is also twice as many as that of ${}_{18}C_1$. That is, when the method proposed by the present invention is used, even though the same transmit power is used for each bit of an MICH, the reception error probability of an NI for each primary notification can be reduced. Further, the number of notification groups increases, such that the probability that the UE unnecessarily receives the MCCH for secondary notification is reduced.

As described in conjunction with FIG. 4, the present invention using Table 1 and Equation (1) has the following characteristics:

1) the number of notification groups within one MICH increases;
2) the probability that the UE unnecessarily receives the MCCH reduces;
3) the LE receives an MICH of 10 ms and may simultaneously have the advantages of 1) and 2) above, such that battery consumption of the UE can be reduced; and
4) even when it is assumed that the same MICH transmit power is used, it is possible to decrease the reception error probability of the NI and increase the number of notification groups.

Additionally, it is necessary to provide a method for corresponding positions of the NIs to the increased notification groups as described above.

Table 2 shows an example for the method for corresponding the positions of the NIs to the notification groups, i.e., ${}_9C_2$. That is, Table 2 shows a correspondence relation between the MBMS notification group and the NI for ${}_9C_2$ according to an embodiment of the present invention.

For ${}_9C_2$, $N_{NI}$ is 9 and NMS is 2. Accordingly, the number of notification groups is 36. Herein, the first column represents notification groups from 0 to 35 according to a combination of ${}_9C_2$, and the columns from 0 to 8 are the positions of each NI. That is, 0 in the first row is the position of the first NI and 8 is the position of the 9$^{th}$ NI. Herein, each allocated NI (shadow portion) indicates that a corresponding NI is set and transmitted as a positive response (+).

That is, when a primary notification for an MBMS belonging to an MBMS notification group 0 is required, a first NI and a second NI are set to 1 and then transmitted.

TABLE 2

| MBMS Notification Group | 0 | 1 | 2 | 3 | 4 | 5 | 6 | 7 | 8 |
|---|---|---|---|---|---|---|---|---|---|
| 0 | | �© | ▨ | | | | | | |
| 1 | | ▨ | | ▨ | | | | | |
| 2 | | | ▨ | ▨ | | | | | |

TABLE 2-continued

| MBMS Notification Group | 0 | 1 | 2 | 3 | 4 | 5 | 6 | 7 | 8 |
|---|---|---|---|---|---|---|---|---|---|
| 3 | ▓ |  | ▓ |  |  |  |  |  |  |
| 4 |  | ▓ | ▓ |  |  |  |  |  |  |
| 5 |  |  | ▓ | ▓ |  |  |  |  |  |
| 6 | ▓ |  |  | ▓ |  |  |  |  |  |
| 7 |  | ▓ |  | ▓ |  |  |  |  |  |
| 8 |  |  | ▓ | ▓ |  |  |  |  |  |
| 9 |  |  |  | ▓ | ▓ |  |  |  |  |
| 10 | ▓ |  |  |  | ▓ |  |  |  |  |
| 11 |  | ▓ |  |  | ▓ |  |  |  |  |
| 12 |  |  | ▓ |  | ▓ |  |  |  |  |
| 13 |  |  |  | ▓ | ▓ |  |  |  |  |
| 14 |  |  |  |  | ▓ | ▓ |  |  |  |
| 15 | ▓ |  |  |  |  | ▓ |  |  |  |
| 16 |  | ▓ |  |  |  | ▓ |  |  |  |
| 17 |  |  | ▓ |  |  | ▓ |  |  |  |
| 18 |  |  |  | ▓ |  | ▓ |  |  |  |
| 19 |  |  |  |  | ▓ | ▓ |  |  |  |
| 20 |  |  |  |  |  | ▓ | ▓ |  |  |
| 21 | ▓ |  |  |  |  |  | ▓ |  |  |
| 22 |  | ▓ |  |  |  |  | ▓ |  |  |
| 23 |  |  | ▓ |  |  |  | ▓ |  |  |
| 24 |  |  |  | ▓ |  |  | ▓ |  |  |
| 25 |  |  |  |  | ▓ |  | ▓ |  |  |
| 26 |  |  |  |  |  | ▓ | ▓ |  |  |
| 27 |  |  |  |  |  |  | ▓ | ▓ |  |
| 28 | ▓ |  |  |  |  |  |  | ▓ |  |
| 29 |  | ▓ |  |  |  |  |  | ▓ |  |
| 30 |  |  | ▓ |  |  |  |  | ▓ |  |
| 31 |  |  |  | ▓ |  |  |  | ▓ |  |
| 32 |  |  |  |  | ▓ |  |  | ▓ |  |
| 33 |  |  |  |  |  | ▓ |  | ▓ |  |
| 34 |  |  |  |  |  |  | ▓ | ▓ |  |
| 35 |  |  |  |  |  |  |  | ▓ | ▓ |

In Table 2, two factors representing a position of an NI are required in order to indicate a correspondence relation between the MBMS notification group and the two NIs. When a position of the first NI is called a $P_{NI1}(I)$ and a position of the second NI is called a $P_{NI2}(J)$, the I and J may have a value of 0 or a positive integer meeting the following equations.

$$MBMS\ \text{Notification Group} = \frac{I \times (I+1)}{2} + J \quad (2)$$

$$I \geq J, \text{ where } I = 0, \ldots, N_{NI} \quad (3)$$

In Equation (3), I is a maximum positive integer meeting Equation (2).

$$P_{NI1}(I) = I+1 \quad (4)$$

$$P_{NI2}(J) = J \quad (5)$$

As described above, $P_{NI1}(I)$ and $P_{NI2}(J)$, i.e., the positions of the NIs are determined using the equations above.

For example, when there is a primary notification for an MBMS belonging to an MBMS notification group 10, I has a value of 4 and J has a value of 0 through Equations (2) and (3). Further, the position of the first NI, which is calculated using Equations (4) and (5), is the fifth NI of 9 NIs, and the position of the second NI is the first NI of 9 NIs. This result can be confirmed in Table 2.

Equations (2) to (5) are true for all values when NNI is larger than 2 and $N_{NIS}$ is 2.

As described above, a correspondence relation of the NIs indicating existence of notification or control information of an MBMS corresponding to the MBMS notification group can be transferred to UEs, which receive the MBMS, through various methods.

Figure 5:
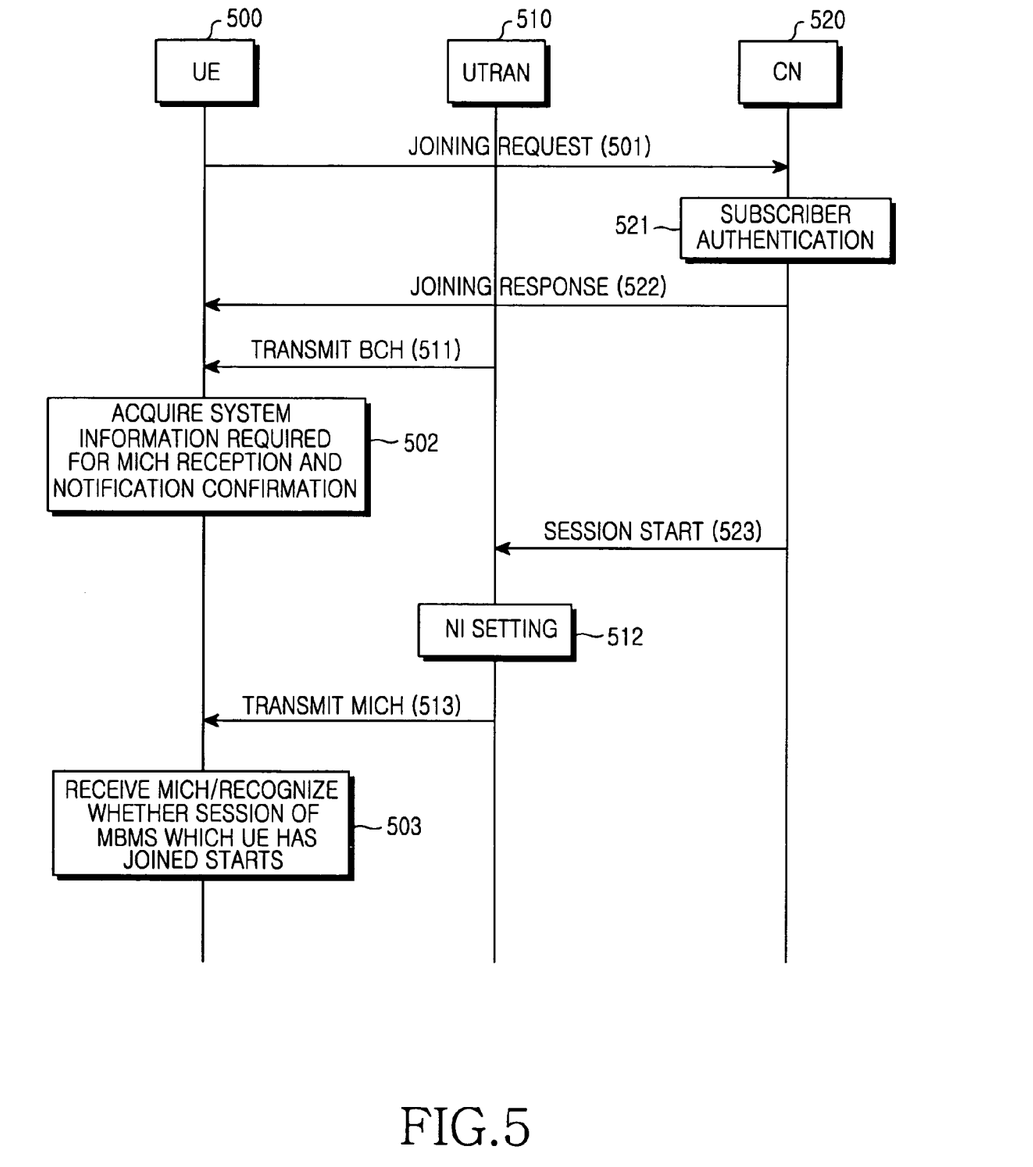
FIG. 5 is a diagram illustrating a process for confirming a position of an NI according to an embodiment of the present invention.

FIG. 5 is a diagram illustrating a process for confirming a position of an NI according to an embodiment of the present invention. That is, FIG. 5 illustrates a method in which a UE can recognize a primary notification for an MBMS that the UE has joined after receiving required information from a UTRAN and a CN.

Referring to FIG. 5, in step 501, when an MBMS requested by the UE 500 exists among MBMSs already recognized through an MBMS announcement, the UE 500 transmits a joining request message to a CN 520. The joining request message may include an identifier of the UE 500 and an identifier of the MBMS requested by the UE 500, and may include other parameters other than the identifiers.

In step 521, the CN 520 performs a subscriber authentication procedure after receiving the joining request message. The subscriber authentication authenticates the UE 500 and confirms if the UE 500 is qualified to receive the MBMS that the UE 500 has joined. Further, the subscriber authentication may include a procedure for determining if it is possible to provide the MBMS requested by the UE 500. Herein, the authentication procedure performed by the CN 520 may also be performed through an entity belonging to the CN 520 or through a plurality entities.

In step 522, the CN 520 transmits a joining response message indicating if the requested MBMS may be received to the UE 500. In step 511, the UE 500 having received the joining response message in step 522 receives a BCH transmitted from a UTRAN 510.

For an easier description of the present invention, FIG. 5 illustrates that the UE 500 receives the BCH after receiving the joining response message. However, the UE 500 can receive system information of a cell including the UE 500 at any time. Herein, the BCH is a broadcasting channel for transmitting system information of a cell including a UE, which transmits information of the CN 520 and the UTRAN 510, etc. In addition, the BCH also transmits information for a common channel capable of being received in the UE 500.

Step 511 represents that the UE 500 receives required information from the BCH in order to perform a primary notification work for the MBMS. That is, in step 511, the UE 500 receives MICH channel information, the total number of NIs transmitted through an MICH of 10 ms, i.e., $N_{NI}$ and $N_{NIS}$ used for recognizing a primary notification, etc. Herein, the MICH channel information may be transmitted through existing system information blocks, etc., of the BCH, and may also be transmitted through other system information blocks of the BCH, which are newly defined for the MBMS.

Accordingly, in step 502, the UE 500 receives an MICH based on the information received in step 511 and continuously determines an existence or absence of a session start or control information of the MBMS that the UE 500 has joined.

Herein, when a start point or a session start point of the MBMS that the UE 500 has joined in an upper layer arrives, the CN 520 transmits a session start message to the UTRAN 510 in step 523. The session start message may include an identifier of the MBMS, control information for transmitting the MBMS, etc.

The UTRAN 510 having received the session start message in step 523 recognizes the start of the MBMS, and sets NIs of an MICH to have proper values in step 512. That is, the UTRAN 510 sets values of the NIs so that UEs have joined the MBMS can recognize the start or the session start of the MBMS, and transmits the NI values through the MICH in step 513.

In step 503, the UE 500 receives the MICH and determines if NIs corresponding to the primary notification for the MBMS that the UE 500 has joined are being transmitted through the MICH while the NIs have positive values. As a result of the determination, when the NIs are transmitted while having the positive values, the UE 500 receives a second notification for receiving a control message transmitted through an MCCH.

That is, when the UE 500 checks positions of the NIs for a corresponding MBMS and the NIs have the positive values for the corresponding MBMS transmitted through the MICH, the UE 500 confirms the MCCH, thereby confirming control information for the corresponding MBMS.

Figure 6:
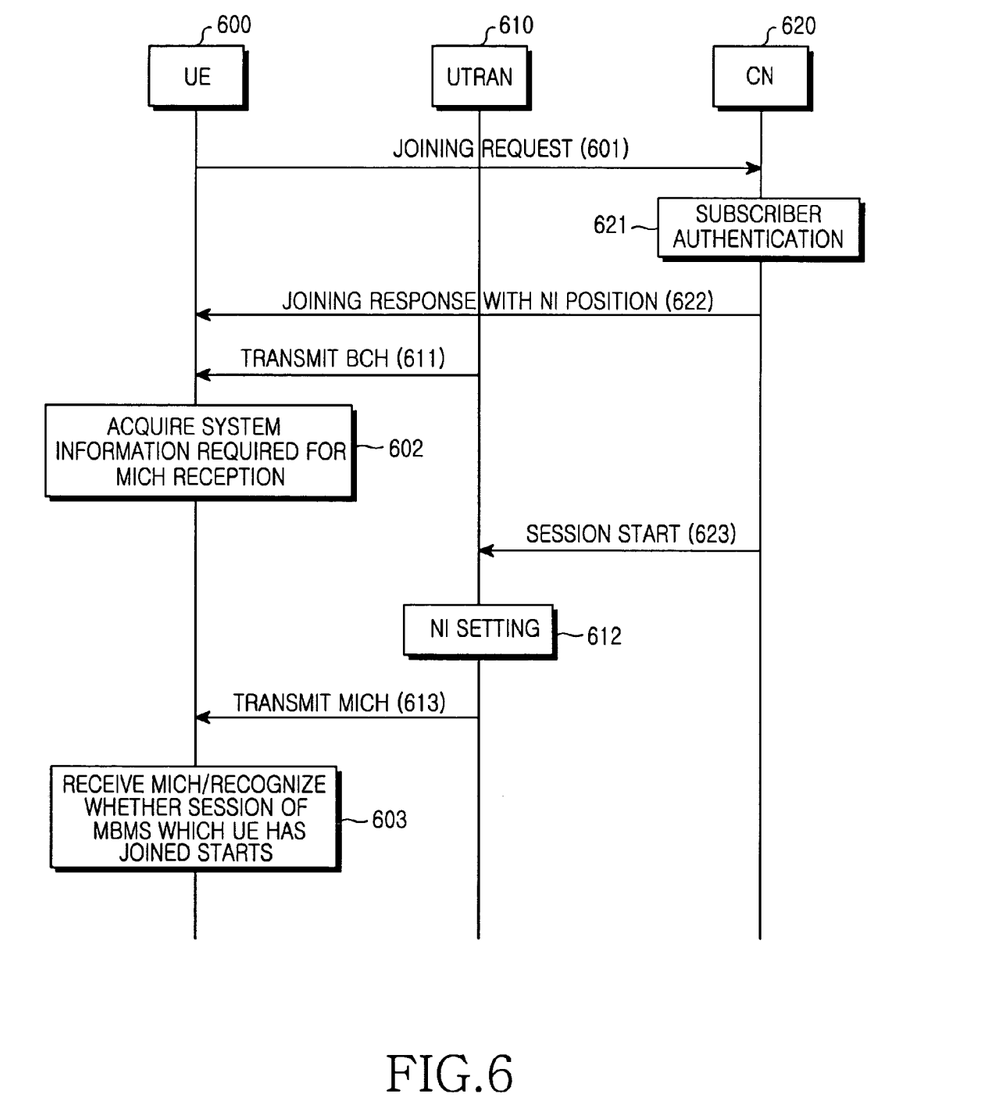
FIG. 6 is a diagram illustrating a process for confirming a position of an NI according to another embodiment of the present invention.

FIG. 6 is a diagram illustrating a process for confirming a position of an NI according to another embodiment of the present invention. That is, FIG. 6 illustrates a method in which a UE can recognize a primary notification for an MBMS that the UE has joined after receiving required information from a CN.

Referring to FIG. 6, in step 601, when an MBMS requested by the UE 600 exists among MBMSs already recognized through an MBMS announcement, the UE 600 transmits a joining request message to a CN 620 for the MBMS that the UE 600 has joined. The joining request message may include an identifier of the UE 600 and an identifier of the MBMS requested by the UE 600, and may include other parameters other than the identifiers.

In step 621, the CN 620 having received the joining request message performs a subscriber authentication procedure. The subscriber authentication authenticates the UE 600 and confirms if the UE 600 is qualified to receive the MBMS. Further, the subscriber authentication may include a procedure for determining if it is possible to provide the MBMS requested by the UE 600.

In step 622, the CN 620 transmits a joining response message indicating if the MBMS requested by the UE 600 may be received to the UE 600. Herein, the joining response message includes supplementary information used for recognizing a primary notification for the MBMS. The supplementary information including NIs that must be confirmed by the UE 600 in order to recognize the primary notification. For example, a bitmap such as "000100001" may be used as the supplementary information. That is, the CN 620 determines a position of an NI for the MBMS and informs the UE 600 of the determined position. According to the bitmap of this example, it can be understood that 9 NIs exist in an MICH and the fourth NI and the ninth NI of the 9 NIs are used for the primary notification of the MBMS requested by the UE 600.

In step 611, the UE 600 having received the joining response message receives a BCH transmitted from a UTRAN 610. This represents that the UE 600 receives required information from the BCH in order to perform a primary notification procedure. That is, in step 611, the UE 600 receives MICH channel information, etc. Herein, the MICH channel information may be transmitted through existing system information blocks, etc., of the BCH, and may also be transmitted through other system information blocks of the BCH, which are newly defined for the MBMS.

Accordingly, the UE 600 receives an MICH based on the information received in step 611 and continuously determines an existence or absence of a session start or control information of the MBMS.

In step 623, when a start point or a session start point of the MBMS occurs, the CN 620 transmits a session start message to the UTRAN 610. The session start message may include an identifier of the MBMS, additional control information for transmitting the MBMS, etc.

The UTRAN 610 recognizes a start of the MBMS corresponding to the session start message after receiving the session start message, and sets NIs of an MICH to have proper values in step 612. Herein, the UTRAN 610 may also recognize NI values through reception of the session start message from the CN 620, or may also recognize the NI values through a separate message from the CN 620. Further, the UTRAN 610 may directly set the NI values. When the separate message is received from the CN 620, the UTRAN 610 may receive an entire correspondence relation between MBMS notification groups and the NIs of the MICH. Accordingly, after receiving the session start message, the UTRAN 610 may set and transmit proper NI values.

In step 613, after the UTRAN 610 sets the NI values so that UEs have joined the MBMS can recognize the start or the session start of the MBMS, it transmits the NI values through the MICH.

In step 603, the UE 600 receives the MICH and determines if NIs corresponding to the primary notification for the MBMS are being transmitted through the MICH while the NIs have positive values. When the NIs are transmitted while having the positive values, the UE 600 performs a second notification for receiving a control message transmitted through an MCCH.

Figure 7:
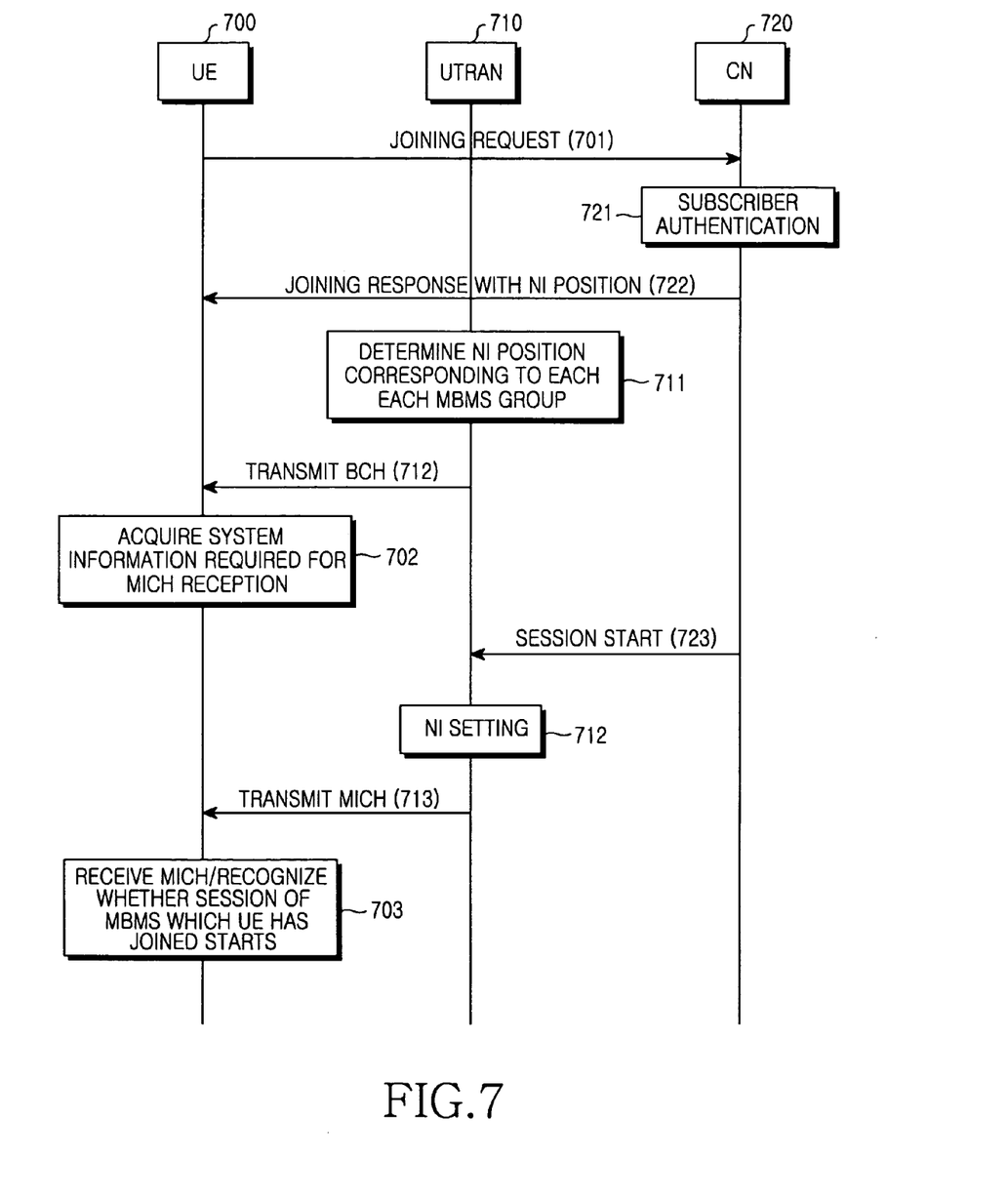
FIG. 7 is a diagram illustrating a process for confirming a position of an NI according to yet another embodiment of the present invention.

FIG. 7 is a diagram illustrating a process for confirming a position of an NI according to another embodiment of the present invention. That is, FIG. 7 illustrates a method in which a UE can recognize a primary notification for an MBMS that the UE has joined, after receiving required information from a UTRAN.

Referring to FIG. 7, in step 701, when an MBMS requested by the UE 700 exists among MBMSs already recognized through an MBMS announcement, the UE 700 transmits a joining request message to a CN 720 for the MBMS that the UE 700 has joined. The joining request message may include an identifier of the UE 700 and an identifier of the MBMS requested by the UE 700, and may include other parameters other than the identifiers.

In step 721, the CN 620 performs a subscriber authentication procedure, after receiving the joining request message.

The subscriber authentication authenticates the UE 700 and confirms if the UE 700 is qualified to receive the MBMS. Further, the subscriber authentication may include a procedure for determining if it is possible to provide the MBMS requested by the UE 700.

In step 722, the CN 720 transmits a joining response message for permitting the UE 700 to receive the requested MBMS to the UE 700. In step 711, a UTRAN 710 sets a correspondence relation between MBMS notification groups and NIs of an MICH, using NNI and $N_{NIS}$. This procedure may be performed even before the UE 700 transmits the joining request message.

In step 712, the UTRAN 710 transmits the correspondence relation between the MBMS notification groups and the NIs of the MICH to the UE 700 and all UEs requesting the MBMS through a BCH. Further, the correspondence relation between the MBMS notification groups and the NIs of the MICH may also be transmitted to UEs having joined the MBMS through an MCCH transmitting MBMS control information.

Herein, in transmitting the correspondence relation between the MBMS notification groups and the NIs of the MICH through the BCH, the correspondence relation may be included in system blocks or other system blocks newly defined for the MBMS and transmitted.

Further, in transmitting the correspondence relation through the MCCH, the UE 700 and all UEs having joined the MBMS acquire information, which is used for receiving the MCCH, from the BCH. Accordingly, the UE 700 and all UEs may recognize the correspondence relation after receiving the MCCH.

That is, after the UE 700 receives the joining response message in step 722, in step 712, the UE 700 receives the BCH transmitted from the UTRAN 710. The UE 700 receives required information from the BCH in order to perform a primary notification procedure. The UE 700 receives MICH channel information, the NNI, the NNIS, and the correspondence relation between the MBMS notification groups and the NIs values, which has been determined in step 711. The above information may be transmitted through system information blocks of the BCH or may also be transmitted through other system information blocks newly defined for the MBMS.

In step 702, the UE 700 receives an MICH based on the information received in step 712 and continuously determines an existence or absence of a session start or control information of the MBMS.

In step 723, when a start point or a session start point of the MBMS occurs, the CN 720 transmits a session start message to the UTRAN 710. The session start message may include an identifier of the MBMS, additional control information for transmitting the MBMS, etc.

The UTRAN 710, having received the session start message recognizes the start of the corresponding MBMS, and sets NIs corresponding to the MBMS of the MICH to have proper values in step 712. Then, in step 713, the UTRAN 710 sets the NI values so that the UE 700 have joined the MBMS and other UEs can recognize the start or the session start of the MBMS, and transmits the NI values through the MICH.

In step 703, the UE 700 receives the MICH and determines if NIs corresponding to the primary notification for the MBMS are being transmitted while the NIs have positive values. When the NIs are transmitted while having the positive values, the UE 700 performs a second notification for receiving a control message transmitted through an MCCH.

According to the present invention, as described above, when a primary notification procedure is performed to report an existence of control information, at least one NI is confirmed to prevent a false alarm causing a UE having joined a random MBMS to start a second notification checking because of a primary notification for another MBMS, such that it is possible to confirm if a primary notification for the MBMS which the UE has joined exists.

Therefore, it is possible to reduce a probability that the UE unnecessarily confirms a second notification, i.e., an MCCH, such that battery consumption of the UE can be reduced and the number of primary notification groups corresponding to the MBMS within one MICH can increase. Consequently, it is possible to provide the MBMS more efficiently.

Although preferred embodiments of the present invention have been described for illustrative purposes, those skilled in the art will appreciate that various modifications, additions, and substitutions are possible, without departing from the scope and spirit of the present invention as disclosed in the accompanying claims, including their full scope of equivalents.

What is claimed is:

1. A method for transmitting, by a radio access network, a notification channel in mobile communication system for providing a broadcast service, the mobile communication system including a user equipment, the radio access network, and a core network, wherein control information for the broadcasting service requested by the user equipment is notified through the notification channel, the radio access network provides the broadcasting service to the user equipments according to services, and the core network is connected to the radio access network for providing the broadcasting service, the method comprising:

transmitting, by the core network, a response message to the user equipment, the response message including position information of at least one notification indicator that indicates if the notification channel for the broadcasting service requested by the user equipment and other broadcasting services exist;

determining, by the radio access network, a number of notification indicators for the broadcasting service by combining a total number of the least one notification indicator and an available number of the at least one notification indicator of a notification indicator channel that indicates if the control information for the broadcasting service and said other broadcasting services exist;

transmitting the determined number of the at least one notification indicator to the user equipment through a broadcasting channel; and transmitting a notification indicator channel, which includes notification indicators having been set to have positive values according to the broadcasting service in the determined position information of the notification indicator, to the user equipment;

wherein a number of groups of the broadcasting service transmitted through the notification indicator channel is expressed by:

Number of Notification Group=$_aC_b$, wherein a=$N_{NI}$, b=$N_{NIs}$, wherein $N_{NI}$ represents a total number of notification indicators existing in a notification indicator channel, and $N_{NIs}$ represents a number of notification indicators for transmitting the control information for the broadcasting service.

* * * * *